G. REHFUSS.
Journal for Sewing-Machine Fly-Wheels.

No. 161,823. Patented April 6, 1875.

Witnesses, Hubert Howson
Thomas McIlvain

Geo. Rehfuss
by his attys.
Howson and Son

THE GRAPHIC CO. PHOTO-LITH. 39 & 41 PARK PLACE, N.Y.

UNITED STATES PATENT OFFICE.

GEORGE REHFUSS, OF PHILADELPHIA, PENNSYLVANIA, ASSIGNOR TO THE AMERICAN BUTTON-HOLE OVERSEAMING AND SEWING-MACHINE COMPANY, OF SAME PLACE.

IMPROVEMENT IN JOURNALS FOR SEWING-MACHINE FLY-WHEELS.

Specification forming part of Letters Patent No. 161,823, dated April 6, 1875; application filed February 15, 1875.

*To all whom it may concern:*

Be it known that I, GEORGE REHFUSS, of Philadelphia, Pennsylvania, have invented a certain Improvement in Sewing-Machines, of which the following is a specification:

The object of my invention is to readily set up the balance-wheel pin of a sewing-machine, when the hub of the wheel becomes loose on the said pin, and this object I attain in the manner I will now proceed to describe, reference being had to the accompanying drawing, in which—

Figure 1:
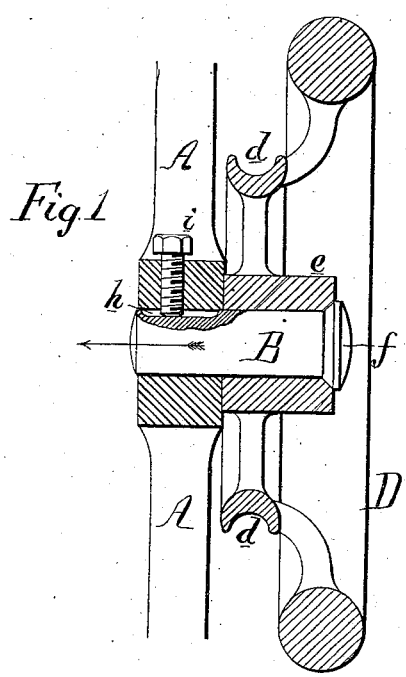
Figure 2:
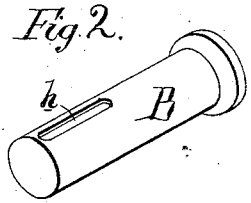

Figure 1 represents a vertical section of the balance-wheel and part of the frame of a sewing-machine; and Fig. 2 a perspective view of the pin.

A represents part of one of the frames or standards of a sewing-machine, and D the balance-wheel, having the usual grooved driving-pulley *d*, and a hub, *e*, adapted to a pin, B, which is fitted snugly into the frame A, but so as to be readily adjusted longitudinally therein. The head *f* of the pin is cone-shaped, and adapted to the conical or countersunk edge of the opening in the hub of the wheel. The pin, where it passes through the frame, has an elongated recess, *h*, best observed in Fig. 2, and in this recess fits the end of a set-screw, *i*, passing through part of the frame, and serving to secure the pin to the same.

When the hub of the wheel, through continued wear, becomes loose on the pin, all that is necessary to take up the slack and prevent the irregular rotation and rattling of the wheel is to first loosen the screw *i*, then set up or adjust the pin in the direction of the arrow to an extent sufficient to properly confine the hub of the wheel between the head *f* and the frame, and then tighten the screw, and this may be done from time to time whenever the hub of the wheel becomes loose on the pin.

I claim as my invention—

The combination of the hub *e* of the balance-wheel, with the pin B, so fitted to the frame as to be adjustable therein, and having a conical head, *f*, and a longitudinal recess, *h*, adapted to the set-screw *i* in the frame, all as set forth.

In testimony whereof I have signed my name to this specification in the presence of two subscribing witnesses.

GEO. REHFUSS.

Witnesses:
 HUBERT HOWSON,
 HARRY SMITH.